US 006621448B1

(12) United States Patent
Lasky et al.

(10) Patent No.: US 6,621,448 B1
(45) Date of Patent: Sep. 16, 2003

(54) NON-CONTACT RADAR SYSTEM FOR RECONSTRUCTION OF SCENES OBSCURED UNDER SNOW AND SIMILAR MATERIAL

(75) Inventors: Ty A. Lasky, Santa Rosa, CA (US); Tabib Shahrdad, Davis, CA (US); Bahram Ravani, El Macero, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/117,988

(22) Filed: Apr. 5, 2002

(51) Int. Cl.⁷ .................. G01S 13/88; G01S 13/89; G01S 13/90; G01V 3/12
(52) U.S. Cl. ............... 342/22; 342/25; 342/27; 342/118; 342/145; 342/146; 342/147; 342/158; 342/175; 342/176; 342/179; 342/190; 342/191; 342/195
(58) Field of Search ............... 342/21, 22, 26, 342/27, 28, 89, 90, 118, 145, 146, 147, 158, 175, 195, 5, 11, 25, 157, 176, 179, 190, 191

(56) References Cited

U.S. PATENT DOCUMENTS

| 3,775,765 A | 11/1973 | Di Piazza et al. |
| 4,045,799 A | 8/1977 | Dapiran |
| 4,072,942 A | 2/1978 | Alongi |
| 4,314,240 A | 2/1982 | Schnug |
| 4,331,957 A | * 5/1982 | Enander et al. ............... 342/22 |
| 4,616,184 A | 10/1986 | Lee et al. |
| 4,698,634 A | 10/1987 | Alongi et al. |
| 4,890,111 A | 12/1989 | Nicolet et al. |
| 4,996,783 A | 3/1991 | Fresia |
| 5,172,110 A | 12/1992 | Tiefengraber |
| 5,202,692 A | 4/1993 | Huguenin et al. |
| 5,307,272 A | 4/1994 | Butler et al. |
| 5,448,501 A | * 9/1995 | Hablov et al. ............... 342/28 |
| 5,452,639 A | 9/1995 | Aulenbacher et al. |
| 5,467,283 A | 11/1995 | Butsuen et al. |
| 5,680,048 A | 10/1997 | Wollny |
| 5,869,967 A | 2/1999 | Straus |
| 5,926,126 A | 7/1999 | Engelman |
| 5,955,982 A | 9/1999 | Moulin |
| 6,031,482 A | 2/2000 | Lemaitre et al. |
| 6,216,540 B1 | 4/2001 | Nelson et al. |

OTHER PUBLICATIONS

Abe, Takeo et al.; "Experimental Study of Microwave Transmission in Snowpack," IEEE Transactions on Geoscience and Remote Sensing, vol. 28, No. 5, pp. 915–921, Sep., 1990.

(List continued on next page.)

Primary Examiner—Bernarr E. Gregory
(74) Attorney, Agent, or Firm—John P. O'Banion

(57) ABSTRACT

A system and method for imaging objects obscured by a covering layer of snow. The system preferably utilizes a continuous-wave radar generating short-wavelength radio-frequency (RF) signal beam-scanned over angular displacements following a scanning pattern toward a target area. Reflections of the:RF signal from objects buried beneath the snow are registered by an array of RF detectors whose signal magnitudes are summed arid correlated with scan direction to generate a signal providing spatial object information, Which by way of example, is visually displayed. The radio-frequency beam may be scanned over the scene electronically or by either mechanically or electromechanically modulating antenna direction or the orientation of a beam deflector. The system is capable of generating multiple image frames per second, high-resolution imaging, registration of objects to a depth exceeding two meters, and can be implemented at low cost without complex signal processing hardware.

41 Claims, 7 Drawing Sheets

OTHER PUBLICATIONS

Hallikainen, Martti T. et al.; "Dielectric Properties of Snow in the 3 to 37 GHz Range," IEEE Transactions on Antennas and Propagation, vol. AP–34, No. 11, pp. 1329–1339, Nov., 1986.

Hallikainen, Martti T. et al.; "Extinction Behavior of Dry Snow in the 18– to 90– GHz Range," IEEE Transactions on Geoscience and Remote Sensing, vol. GE–25, No. 6, pp. 737–745, Nov., 1987.

Ishizuka, Yousuke et al.; "Field Strength Radiated From Horn Antenna Above a Lossy Medium by Boudary Element Analysis," pp. 1–4, (1994).

Lasky, T.A. et al.; "Advanced Construction Maintenance Systems (ACMS) for Winter Operations In Rural Environments," Rural Advanced Technology and Transportation Systems International Conference, pp.1–11, Flagstaff, AZ.

Lasky, T.A. et al.; "The Advanced Snowplow Driver Assistance System," Sixth Annual World Congress on INtelligent Transportation Systems, pp. 1–8, Toronto, Canada.

Paul, J. et al.; "Time–Domain Modelling of Negative Refractive Index Material," Electronics Letters, vol. 37, No. 14, pp. 912–913, Jul. 5, 2001.

Sakamoto, Yuji et al.; "Three–Dimensional Imaging of Objects in Accumulated Snow Using Multifrequency Holography," IEEE Transactions on Geoscience and Remote Sensing, vol. 26, No. 4, pp. 430–436, Jul., 1988.

Scott, Waymond R. Jr. et al.; "Experimental Model for a Seismic Landmine Detection System," IEEE Transactions on Geoscience and Remote Sensing, vol. 39, No. 6, pp. 1155–1164, Jun., 2001.

Shelby, R.A. et al.; "Microwave Transmission Through a Two–Dimensional, Isotropic, Left–Handed Metamaterial," Applied Physics Letters, vol. 78, No. 4, pp. 489–491, Jan. 22, 2001.

Shelby, R.A. et al.; "Experimental Verification of a Negative Index of Refraction," Science, vol. 292, pp. 77–79, Apr. 6, 2001.

Smith, D.R. et al.; "Composite Medium with Simultaneously Negative Permeability and Permittivity," Physical Review Letters, vol. 84, No. 18, pp. 4184–4187, May 1, 2000.

Smith, D.R. et al.; "Negative Refractive Index in Left–Handed Materials," Physical Review Letters, vol. 85, No. 14, pp. 2933–2936, Oct. 2, 2000.

Smith, D.R. et al.; "Direct Calculation of Permeability and Permittivity for a Left0Handed Metamaterial," Applied Physics Letters, vol. 77, No. 14, pp. 2246–2248, Oct. 2, 2000.

Thorne, C.E. et al.; "Advanced Collision Warning System for the Roadview Snowplow Driver Assistance System," Seventh Annual World Congress on Intelligent Transportation Systems, pp. 1 thru 10, Turin, Italy.

Yamaguchi, Yoshio et al.; "Detection of Objects Buried in Wet Snowpack by an FM–CW Radar," IEEE Transactions on Geoscience and Remote Sensing, vol. 29, No. 2, pp. 201–208, Mar., 1991.

Yamaguchi, Yoshio et al.; "Human Body Detection in West Snowpack by an FM–CW Radar," IEEE Transactions on Geoscience and Remote Sensing, vol. 30, No. 1, pp. 186–189, Jan., 1992.

Yamaguchi, Yoshio et al.; "Synthetic Aperture FM–CW Radar Applied to the Detection of Objects Buried in Snowpack," IEEE Transactions on Geoscience and Remote Sensing, vol. 32, No. 1, pp. 11–18, Jan., 1994.

Yamaguchi, Yoshio et al.; "Polarimetric Detection of Objects Buried in Snowpack by a Synthetic Aperture FM–CW Radar," IEEE Transactions on Geoscience and Remote Sensing, vol. 34, No. 1, pp. 45–51, Jan., 1996.

Yen, Kin S. et al.; "Development of an Advanced Snowplow Driver Assistance Sytem (ASP–II)," AHMCT Research Report, University of California at Davis, California Department of Transportation, Cover Page, i thru xix, pp. 1 thru 50.

Moriyama, Toshifumi et al.; "Advanced Polarimetric Subsurface FM–CW Radar," IEEE Transactions on Geoscience and Remote Sensing, vol. 36, No. 3, pp. 725 thru 731, May, 1998.

Koh, Gary, "Dielectric Properties of Ice and Snow at 26.5 to 40 GHz," IEEE, pp. 820 thru 822, U.S. Army Cold Regions Research and Engineering Laboratory, Hanover, NH 03755–1290.

Pendry, J.B.; "Negative Refraction Makes a Perfect Lens," Physical Review Letters, vol. 85, No. 18, pp. 3966 thru 3969, Oct. 30, 2000.

* cited by examiner

NON-CONTACT RADAR SYSTEM FOR RECONSTRUCTION OF SCENES OBSCURED UNDER SNOW AND SIMILAR MATERIAL

STATEMENT REGARDING FEDERALLY SPONSORED RESEARCH OR DEVELOPMENT

This invention was made with Government support under Contract No. RTA 65A0068, awarded by the Department of Transportation. The Government has certain rights in this invention.

CROSS-REFERENCE TO RELATED APPLICATIONS

Not Applicable

REFERENCE TO A COMPUTER PROGRAM APPENDIX

Not Applicable

BACKGROUND OF THE INVENTION

1. Field of the Invention

This invention pertains generally to radar detection systems, and more particularly to a system and method for identifying hidden objects obscured beneath a layer of snow.

2. Description of the Background Art

Detecting objects whose visibility is obscured by accumulated snow has posed a challenge in a number of application areas. Snow removal equipment, such as snow blowers and snowplows, along with other types of vehicles traversing roads or other areas heavily laden with snow, are often subject to collision and damage from guardrails, vehicles, signage, fences, garbage, and other assorted objects hidden by the snow. Other applications exist for detecting objects beneath a layer of snow, such as for use by searchers and law enforcement personnel, which must meet the challenge of finding persons, or objects, which may be buried under one or more accumulated layers of snow. Currently, equipment operators, individuals performing a search, and other individuals subject to activity within snow laden environments have no readily available means of gathering information and images about objects which are otherwise hidden by layers of snow.

Mechanical detectors are conventionally utilized in snow removal equipment for detecting objects, and are an attempt to reduce the amount of damage caused by encounters with obstacles hidden beneath the snow. It will be appreciated that objects buried in the snow may pose a hazard to equipment, such as being ingested by a snow blower when clearing a snow bank. Furthermore, the snow removal equipment may damage items, such as vehicles, the visibility of which is obscured by one or more layers of snow. Detection using a mechanical detector requires a portion of the mechanical detector to make contact with the obstacle, and the technique is not capable of providing an image, or other information, as to the nature of the obstruction, or about those parts of the obstruction which are still hidden beneath the snow. It should be appreciated that the required contact force for such a mechanism is necessarily high so that the unit is not disengaged upon contact with packed snow or icy patches. A high contact force of this nature would often be sufficient to damage trapped vehicles, signage, and so forth. Therefore, mechanical sensing does not provide for the detection of an object prior to contact, and it does not provide imaging of objects hidden beneath the snow. It should also be appreciated that many obstacles typically encountered in a number of applications would not trigger a mechanical detection mechanism, however, they could still represent a significant threat, such as to a moving snowplow vehicle. For example, a number of-smaller objects can be ingested by a rotary plow which may completely entangle the rotary mechanism thereby rendering it inoperative, while requiring extensive time, effort, and expense to repair.

Techniques for detecting individuals buried under avalanches generally utilize forms of cooperative sensing, such as requiring the use of an active transmitter or passive transponder by a buried individual. It will be appreciated that cooperative means are not appropriate when the detection of vehicles, trees, storage containers, snow chains, culvert materials, and other inanimate objects is necessary, or when a priori equipping of an individual with a transmitter is not possible. One proposed non-cooperative technique utilizes at least two, and typically numerous, receiving antennas configured to detect reflected RF energy to determine the direction of the target, however, it is incapable of providing sufficient resolution for imaging obstructions buried in snow.

Techniques are being deployed by the military for obtaining images of the soil by using ground-penetrating radar (GPR). The use of GPR requires transmit/receive antennas which are in contact, or in close proximity, with the ground. Thus, obtaining images using such a system requires the physical relocation of the GPR antenna over the ground area. GPR systems are intended to image objects on or very near the surface of sand or soil, and are not configured for detecting objects within a snow bank, or other accumulation of snow, wherein detecting objects to a depth of about two meters is necessary. It will be further appreciated that the lack of homogeneity within a snow environment presents unique challenges for an object sensing technique. GPR applications generally require complex signal processing to be performed to eliminate unwanted signals and to provide for imaging of the results, as a result of which real-time signal and image processing may not be feasible or cost-effective in these cases. In addition, these GPR systems have been geared toward military applications, such as the detection of unexploded ordinance (UXO). Aside from the aforementioned difficulties, the GPR systems also suffer in the area of system complexity, size, and cost, thereby reducing their applicability such as for civilian transportation applications.

Therefore, a need exists for an apparatus that provides for the detection and imaging of objects obscured beneath a layer of snow which is not subject to the limitations as outlined above. The present invention satisfies those needs, as well as others, and overcomes the deficiencies of previously developed solutions.

BRIEF SUMMARY OF THE INVENTION

The present invention is a non-contact system and method for detecting and/or imaging of objects which are obscured beneath snow, or materials of similar composition. The snow penetrating radar system and method presented herein is applicable to a number of applications and is particularly well-suited for search and rescue situations, and for the prevention of damage to machines operating in snow, such as snow removal equipment. The-system maybe implemented as a compact low-cost unit that may be mounted upon a-movable platform, such as a motor vehicle, aircraft (i.e. helicopters), or a mobile individual (i.e. person on foot or on horseback). By utilizing the present invention on snow removal equipment, collisions with objects hidden beneath the snow may be prevented, and the damage resulting from the ingestion of small objects into the blade mechanism of rotary snowplows, ("blowers") can be circumvented. The ability to reconstruct object images for identifying objects obscured by snow allows-for the rapid scanning of a snow scene, for example an avalanche site, from several meters above the scene while detecting, locating, and possible victims. The ability to discern victims from debris can facilitate victim rescue operations in snow-laden areas.

The method utilized within the invention for detecting objects beneath a layer of snow is conceptually similar to the ground-penetrating radar utilized by the military. However, the system and method of the present invention does not require the physical movement of an antenna over ground areas to be imaged, and is capable of imaging obscured objects without the need of pulsed radar phase measurements in combination with expensive and complicated digital signal image processing techniques to reconstruct an object image. The present system and method is configured to reconstruct real-time multiple frames per second non-specular object images without making contact with the objects and regardless of the condition of the overlying snow, such as powder, packed snow, very dense snow, dry snow, wet snow, and combinations thereof.

Imaging through snow with the present system allows scanning of a scene in from one to three dimensions, with the preferred use of two dimensions such as azimuth and elevation. The radar utilized herein provides a continuous wave output in preference to the conventional pulsed radar systems which provide imaging through the registration of phase differences. Objects may be registered from several meters distance while providing sufficient resolution to detect objects which could pose a danger to snow removal equipment, and the like.

The system generates a narrow radio-frequency (RF) output signal beam, preferably at a microwave frequency, whose output beam is scanned across a target scene by any conventional RF scanning mechanism. It will be appreciated that an RF beam may be scanned using a number of methodologies, including electronic beam scanning, mechanical and electromechanical scanning of antenna assemblies or deflector assemblies. In any of these approaches the beam width may be optionally modified by passing the beam through one or more lenses, such as a negative refraction index lens to narrow the beam width toward the target area which may contain one or more objects obscured beneath a layer, or layers, of snow. The RF energy penetrates through the snow and will be reflected from underlying solid objects. A receiver antenna array receives and sums the RF energy reflected from the underlying objects. The detected RF signal is conditioned within the receiver, by filtering and amplitude compensation, prior to conversion of the magnitude-only signal to an object detection signal for use by an annunciator which indicates or displays information about said object from said object detection signal. In the process of converting the detected RF signal to an object detection signal, the position along the scan path which determines the direction of the transmitted beam toward target area, is correlated with the amplitude (magnitude) of the detected RF so that the resultant spatial information signal preferably includes both position and amplitude information based on the reflected RF signal received from the target area. The correlation is preferably performed by combining the magnitude and direction information into a single object detection signal which drives an image display. For example, when directed to an image display unit the characteristics of pixels are modulated, such as according to intensity and/or color, within the object detection signal according to the magnitude of the detected RF signal, while the position of the pixels on the display unit is determined in relation to the direction at which the corresponding RF signal beam was transmitted toward the target area. It will be appreciated that the direction of the transmitted RF beam toward the target area may be determined in response to the position of a mechanical or electromechanical scanning system, or depending on phase relationships or field intensities in the case of electronic beam scanning. In the case of a mechanical or electromechanical scanner assembly which modulates either the antenna direction or modulates beam deflection from an antenna assembly, the scan path may be registered in response to the physical position of one or more mechanical positioners along a given path. The annunciator may comprise a display unit, audio alert device, haptic feedback device, or other feedback units, utilized either singly or in combinations thereof, to indicate the presence, position, and/or distance of objects within the target area. It will be appreciated that the use of a display unit for annunciating is generally substantially preferred as it provides reconstruction of object images from which an operator can intuitively glean a wealth of information. The use of a display unit may be optionally augmented with audible, tactile, haptic, and other visual alerts which may be generated in response to the condition of objects in the target area. The use of haptic feedback for distance warning has the added benefits of being noticeable to an operator whose visual focus is directed outside the vehicle and it remains noticeable despite severe noise, such as generated by a mechanical snow blower. The haptic feedback is preferably coupled to the operator seat or operator controls for easy detection by the operator during use of the system on a mobile platform. The complexity and cost of the present system is minimized by the use of continuous wave output, wherein complex phase processing electronics are not necessary. In addition, the beam scanning mechanism is capable of scanning the RF output signal beam across a target surface without the necessity of physically moving a transmitter or detector array over the ground surface in the target area. Three-dimensional images may be captured by utilizing more than one RF source which may be scanned over the target surface from slightly different angles.

Synthetic aperture imaging techniques may be utilized to combine multiple reflection images captured from slightly differing vantage points into images having a higher pixel resolution than the original reflection images. It will be appreciated that the technique requires knowledge of the relative positions from said object to which the images were obtained, as may be provided by movement registration or the receipt of position information such as high accuracy GPS coordinates. Furthermore, the transmitter and detector positions may be spatially modulated to provide capturing multiple spatially displaced images from a stationary.location.

An object of the invention is to provide a system and method for acquiring images of objects obscured by a layer of snow.

Another object of the invention is to provide a system and method which can be utilized from a moving platform, such as mounted on a vehicle, aircraft, or mobile individual.

Another object of the invention is to provide an imaging apparatus that operates through snow regardless of its condition, such as powder, packed snow, very dense snow, dry snow, wet snow, and combinations thereof.

Another object of the invention is to provide an imaging system for use in snow that can detect objects from a distance of at least one to two meters.

Another object of the invention is to provide a hidden object imaging apparatus for use in snow that does not require the physical movement of an antenna over the surface of the snow in order to generate object images.

Another object of the invention is to provide scanning of objects beneath a layer of snow, or similar composition, by reflecting continuous wave RF energy from the surface of hidden objects.

Another object of the invention is to provide real-time output with multiple frames per second output.

Another object of the invention is to provide non-specular images having high image quality.

Another object of the invention is to provide object imaging without the necessity of extensive signal processing.

Another object of the invention is to provide a method of imaging objects beneath snow which can be implemented at low cost.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the systems, methods, and apparatus generally shown in FIG. 1 through FIG. 7. It will be appreciated that the systems and apparatus may vary as to configuration and as to details of the elements, and that the methods may vary as to the specific steps and sequence, without departing from the basic concepts as disclosed herein.

Figure 1:
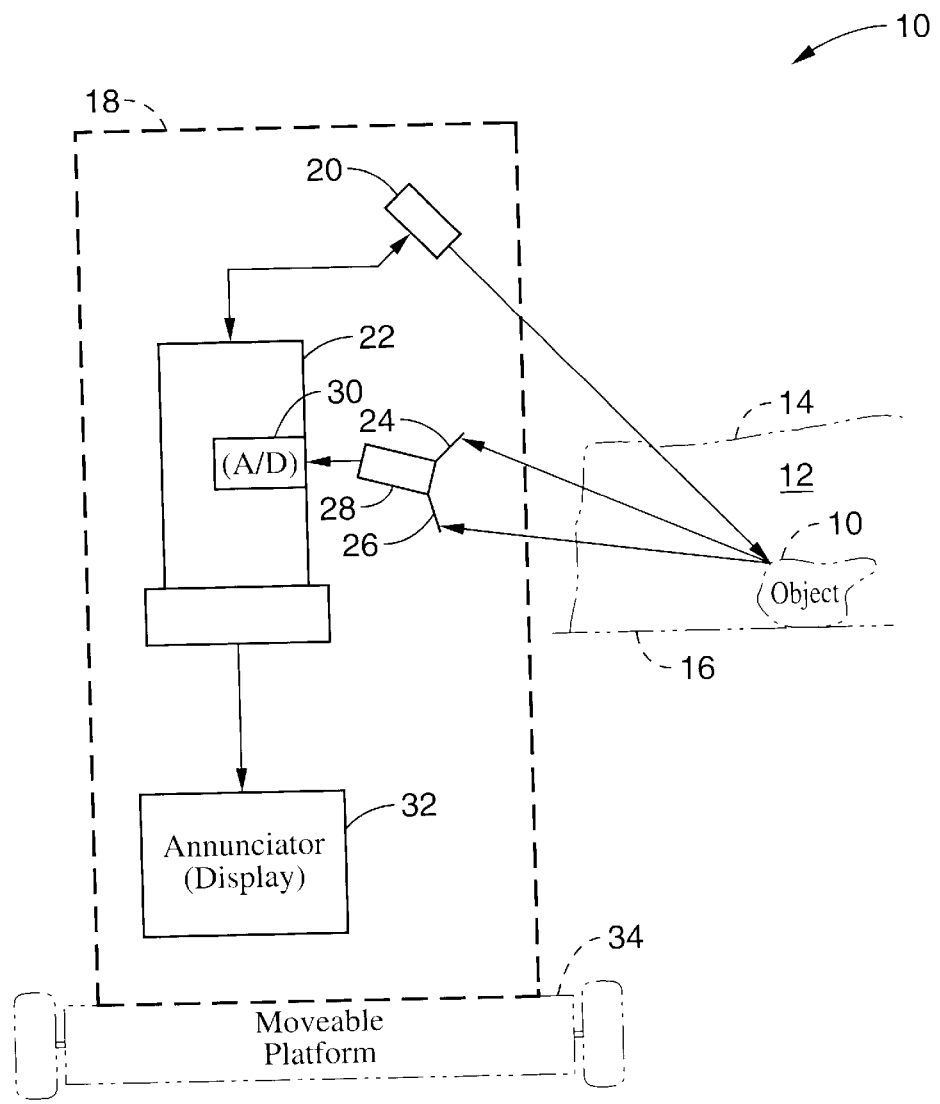
FIG. 1 is a schematic view of an imaging system according to an embodiment of the present invention, shown generating an image for an object which is hidden beneath a snow bank.

Referring first to FIG. 1, an example of the overall operational configuration of the invention can be seen. In FIG. 1, an object 10 is shown as being obscured by snow 12 in a snow bank 14 which in turn is shown as being located on a roadway surface 16. FIG. 1 also depicts an object imaging system 18 according to the present invention that is configured for detecting objects, such as object 10, that are obscured by snow.

In the embodiment shown, imaging system 18 is configured to scan a target area with high frequency RF energy and detect the energy pattern reflected from an object. To do so, a narrow-beam high frequency RF energy source 20, such as a microwave transmitter or the like and associated antenna or antenna array, is adapted with a beam scanning mechanism configured to direct the RF signal across a scan path directed toward the target area. The beam scanning mechanism can be mechanical, electromechanical, electronic or the like, as will be described in detail below. The beam scanning mechanism is preferably either controlled by programming operable on a computer 22 or the like. Alternatively, the beam scanning mechanism follows a scan path controlled by another element wherein the scan position is monitored by programming operable on computer 22 or similar control system.

RF energy reflected by object 10 is received by an RF receiver, such as an array of detector elements 24, 26 and signal processing circuitry 28. Detector elements 24, 26 are preferably spaced apart and oriented in the general direction of the area to be scanned, which is also referred to herein as the "target area", within which the detection of objects is sought. Detector elements 24, 26 may comprise any form of high-frequency RF detector elements, such as microwave horns with associated Schottky diode detectors or the like.

Note that the output of the detector elements is utilized only for detecting signal amplitude, and that phase information is not necessary for operation of the invention. Note also that increasing the number of detector elements leads to improvements in resolution since reflected energy can be detected over a larger angular spread. For example, while arrays as small as 2×2 RF detection pixels can provide usable results, enhanced resolution can be achieved with arrays up to 100×100 or more RF detection pixels. It will also be appreciated that small modulations of detector array position, with known positional variance from one frame to another frame, used in combination with conventional synthetic aperture imaging techniques can render increases in image resolution as well. It will further be appreciated that, for very low-resolution detection, such as distance detection of objects obscured beneath the snow, a single detector element can be used if desired.

Signal processing circuitry 28 preferably comprises signal filtering and amplification circuitry configured to condition and prepare the detected signals for processing. Amplifier gain is preferably controlled by computer 22, or a similar digital processor, which can provide benefits such as maximizing the signal-to-noise ratio. The conditioned output signal is then directed to an analog-to-digital (A/D) converter 30, preferably associated with computer 22, although A/D converter 30 could be included within signal processing circuitry 28 or provided in some other configuration. Computer 22, which can be used for additional signal processing or data extraction, in turn generates an object detection signal which is directed to one or more annunciators 32. It is preferable that annunciator 32 comprise at least a visual display as a primary form of annunciation and one or more secondary forms of annunciation as described below.

Examples of secondary forms of annunciation include, but are not limited to, audible, visual, kinesthetic and other alert mechanisms that are suitable for alerting the operator to the proximity of obstructions when their attention is focused somewhere other than the visual display. For example, the secondary annunicator may comprise a bright yellow or other colored LED or other light emitting element, an audio output generating a warning beep, and a haptic feedback device. A haptic feedback device coupled to the seat or controls of the operator console will oscillate or vibrate to alert the operator of upcoming obstructions or other alert conditions. These secondary annunciators, when use singly or in combination, provide forms of feedback to the operator that can be used to alert the operator to dangerous conditions, such as posed by the proximity to obstructions obscured beneath snow. Where a haptic form of annunciation is used, it will be appreciated that the output of haptic feedback should be sufficiently high that it is recognized by the operator even in high noise level environments and at times when the operator is not in a position to see a visual alert.

Preferably, the object detection signal is generated as a digitized image signal or the like which may be directly displayed on any conventional image display device such as a CRT display, plasma display, LCD display, head-up display, and so forth. It will be appreciated that image processing can also be performed on the object signal prior to receipt by an annunciator, such as a visual image display unit, if desired. It should also be appreciated that image metrics along with other information, such as information from other forms of detectors, (e.g. metal detection), position information from a GPS, and so forth, may be displayed in combination with an image generated according to the radar detection method of the present invention.

It is preferable that real-time images be presented by the system to a human operator to provide an intuitive visual interface with information displayed in a manner that coincides with everyday experience such as, for example, the viewing of a streambed beneath a gently flowing stream or the viewing of an image through a glass window despite the presence of reflections. Therefore, it will be appreciated that the need of operator training for using the present invention can be greatly reduced, which is in contrast to the high level of training necessary to properly utilize conventional radar imaging systems. Furthermore, it is preferred that operator feedback be provided in the form of a warning based on the distance to an obstruction detected beneath the snow, because the attention of the operator may not be directed at an image display screen at every moment during operation. Preferably, the warning is generated using haptic feedback, such as in vibrating the seat, or controls, of the operator, wherein feedback cognizance is maintained in high noise environments and in situations in which the operator is not monitoring a visual display.

It will be appreciated that imaging system 18 and the various forms of associated alerts are particularly suitable for detecting obstructions obscured by snow which pose a danger to the vehicle during normal operations, and when maneuvering, such as during backing up the vehicle. Imaging system 18 is preferably adapted for being carried by, or integrated within, a moving platform 34, such as a vehicle, person on foot, aircraft (i.e. helicopter), and so forth. Note also that, while FIG. 1 shows the detection signal being directed toward a particular target area off the side of the vehicle, the vehicle could be equipped to direct a signal from different sides or quadrants about the vehicle to facilitate detecting hidden objects when traveling, such as when backing up. This could be done, for example, by making the emitter/detector array moveable and remotely positionable, or even portable. Alternately, one or more additional detection systems or emitter/detector arrays could be positioned at one or more additional locations of the vehicle.

Figure 2:
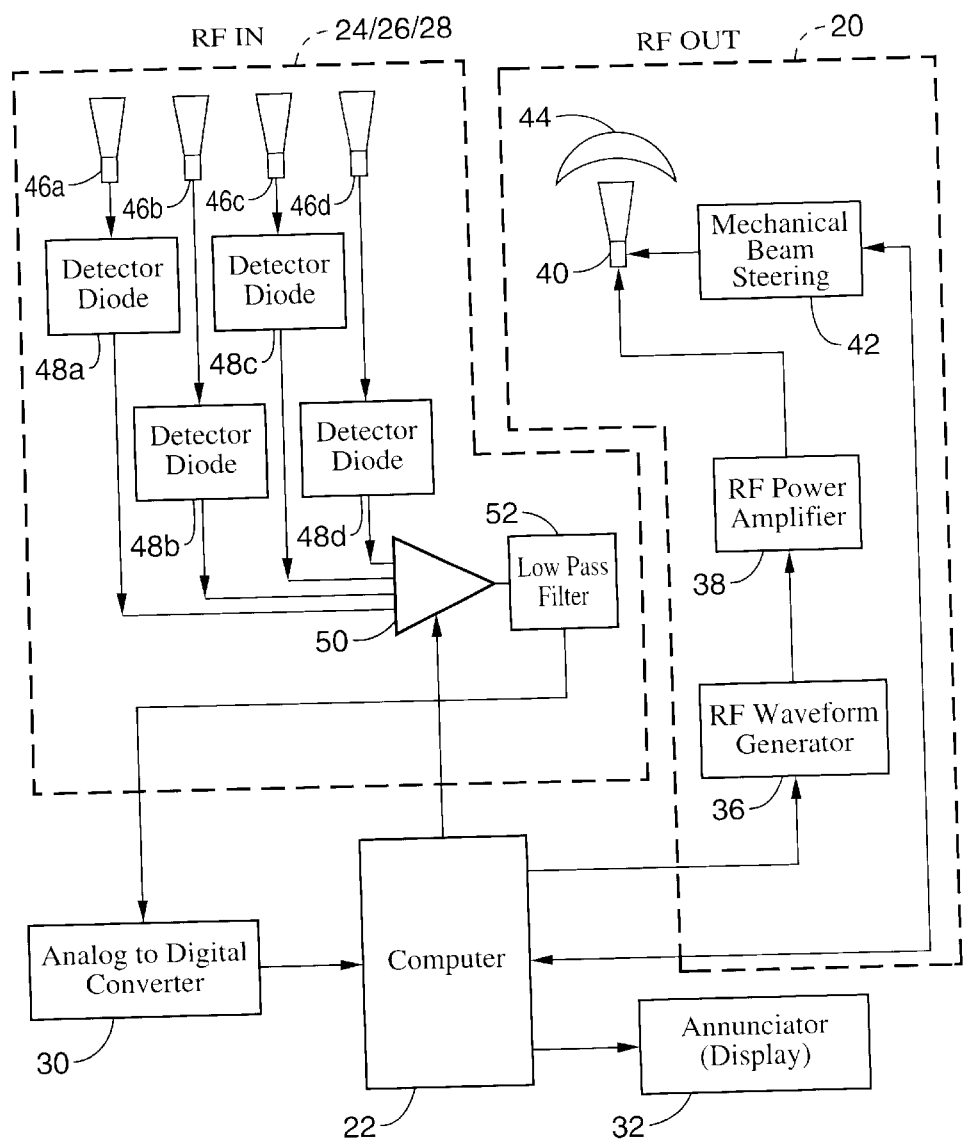
FIG. 2 is an electrical schematic for the imaging system of FIG. 1, shown using a mechanically scanned beam antenna.

Referring now to FIG. 2, an embodiment of object imaging system 18 is schematically shown in additional detail. Computer 22, or a similar control system, is computer 22 controls an RF waveform generator 36, which preferably generates a low-power RF signal in the appropriate frequency range (based on anticipated snow moisture content) to penetrate snow but be reflected from solid material objects beneath the snow to provide the desired image or detection resolution. For example, a range of frequencies between approximately 100 MHz and approximately 6 GHz can be used depending on the cost and desired resolution. The preferred frequency, however, is approximately 4 GHz where a resolution on the order of one centimeter can be achieved.

The output of waveform generator 36 is amplified by an RF power amplifier 38 to provide a power output at a sufficient level to allow proper detection of the reflected signals. The RF power output preferably ranges from approximately 100 mW to approximately 2 W. It should be appreciated, however, that the selection of optimum power output depends on a number factors, including transmission restrictions, operating conditions, environmental conditions, and desired resolution. In a preferred embodiment, the output power is on the order of 1 W from the antenna. The output of amplifier 38 is shown coupled to a small rutile (titanium dioxide) dielectric-filled output horn antenna 40 for generating a narrow beam of high frequency electromagnetic radiation since the preferred RF source is in the microwave frequency region. By filling the horn with a high dielectric constant material, the size of the horn can be reduced by a factor of approximately ten in comparison with an air-filled horn, so that a narrow beam diameter may be attained. It should be appreciated that the dielectric material may be configured with a flat or convex external surface. It will further be appreciated that specific antenna configurations will depend on the particular frequency or frequencies chosen.

In the embodiment shown in FIG. 1, beam scanning is accomplished using a conventional mechanical or electro-mechanical beam steering mechanism 42 or the like that is mechanically coupled to horn 40 to modulate its angular position so as to follow a scan path directed toward the target area. A lens 44 is preferably affixed to, or otherwise associated with, the movable horn to narrow the beam to a small transmission aperture, and is preferably configured with a negative refractive index. It will be appreciated that a lens with a negative refractive index may be configured with a spherical concave internal surface and a paraboloid convex external surface where the center of the inner spherical surface and the focal point of the outer paraboloid surface coincide. Such a lens can then be positioned such that the focal point resides at the phase-center of horn 40. In this way, lens 44 increases system resolution since the RF signal will be directed toward the target area through a small transmission aperture as a narrow beam. Therefore, a negative refractive index lens facilitates directing the narrow beam width toward the target area at the desired operating frequency. The RF output of horn 40 is fed to lens 44 with an appropriate passband associated with the frequency of the desired RF output signal to be transmitted. In this regard, however, note that the lens will attenuate the output signal and, therefore, power output needs to be of sufficient magnitude to assure that the reflected signal is of sufficient strength to assure proper registration by the detectors.

As described above with reference to FIG. 1, reflection of the narrow RF beam from an object located in the target area is detected by an array of detector elements 24, 26. In FIG. 2, these detector elements are represented by an array of horn antennas 46 and associated diode detectors 48. The reflected signals are converted to low frequency magnitude (amplitude only) signals by the diode detectors 48, whose outputs are summed and amplified by a summing amplifier 50 prior to being conditioned for conversion to digital signals. Although only four detectors and associated circuitry are shown by way of example, it will be appreciated that a sufficient number should be incorporated to achieve the desired object resolution and target area for the scene being viewed. Use of a detector array provides for a large effective combined receiver aperture.

The conditioning circuitry preferably comprises a low-pass filter 52, which conditions the summed detector signals prior to receipt by analog-to-digital (A/D) converter 30. A low cost analog-to-digital (A/D) converter, such as providing between 8 to 12 bits of resolution, is suitable for use with the present invention whereby a resolution of 100×100 pixels can be supported with a one frame per second (1 Hz) image update rate by sampling the A/D converter at a 10 KHz rate. The system can be readily configured to yield image rates exceeding several frames per second so that real-time images are provided to a user or operator. Digital data from A/D 30 is received by computer 22, which processes the digitized detector data according to the scanning direction, such as azimuth and elevation as known to, or set by, computer 22 at, or shortly before, a given detection instant. The computer then generates an object detection signal containing spatial information about hidden objects based on the signal magnitude registered by the RF detector and the direction of the transmitted RF signal beam, as determined by position along a scan path. The object detection signal is in turn announced by annunciator 32.

As described above, the object detection signal preferably comprises an image signal in a protocol that is compatible with an image display unit, upon which object images may be displayed. Annunciation of information about objects in the target area may be provided by audio annunciators, indicators, image displays, tactile or haptic feedback, and combinations thereof, for providing information and/or an alert regarding target area objects as previously described. It should be appreciated that complex software is not required for generating an object detection signal. For example, an object detection signal may be generated for an image display in a number of ways, such as by storing amplitude values of detected RF signal amplitudes (e.g., magnitudes) according to position (e.g., azimuth and elevation) associated with the predetermined scanning pattern, and then outputting this stored data to a display unit, such as in a raster scanning pattern. The resulting image thus formed on the display unit provides spatial information including both position and intensity in relation to the detected reflections from objects within the target area that may be covered by snow.

Figure 3:
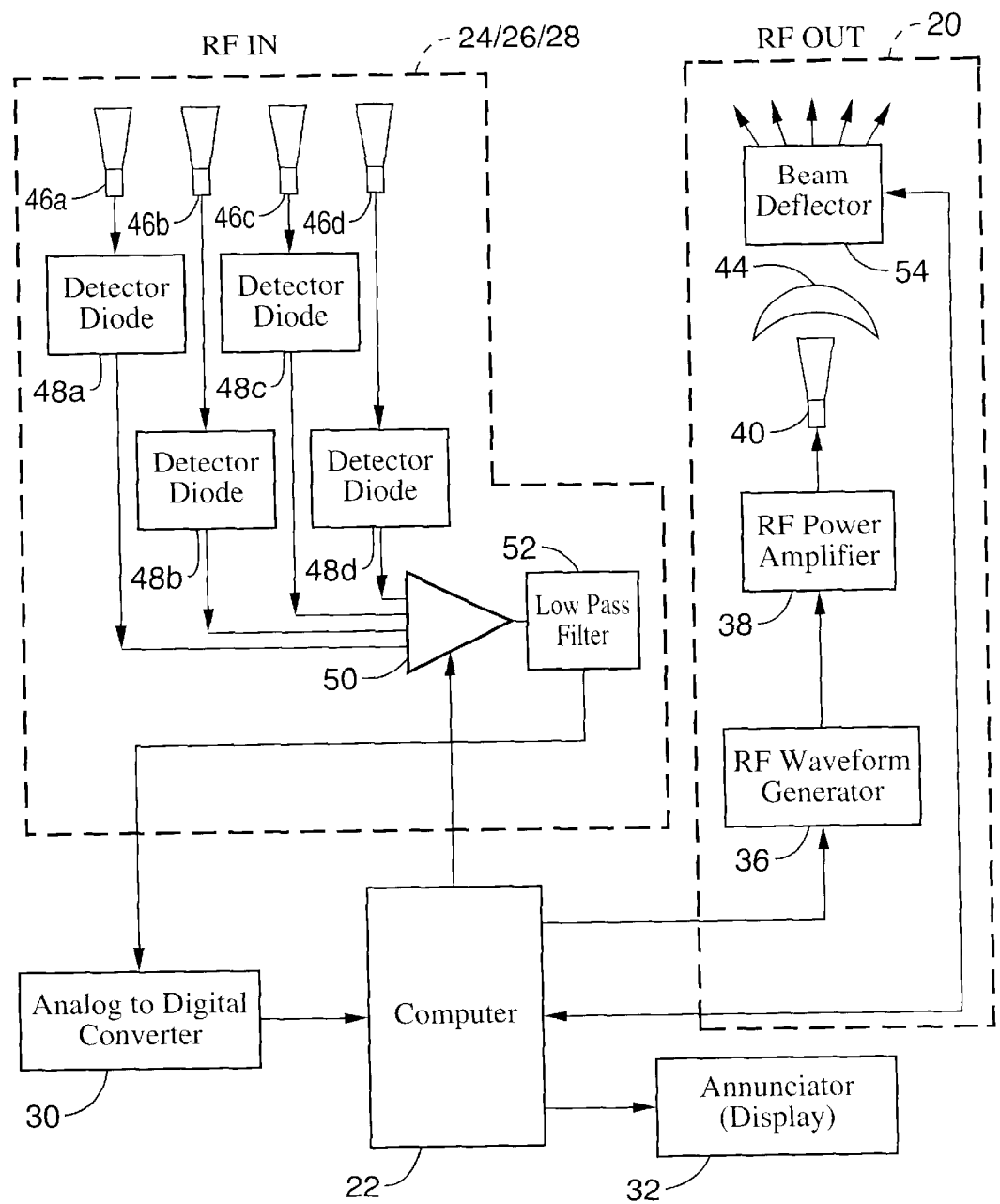
FIG. 3 is an electrical schematic for another embodiment of the imaging system according to the present invention, shown using a beam deflector assembly.

FIG. 3 depicts an embodiment of the system in which, instead of using a beam steering mechanism for modulating the position of the output horn as shown in FIG. 2, beam scanning is provided by the use of a conventional moving mechanical or electromechanical beam RF deflector assembly 54 which modulates the direction of the beam exiting lens 44, thereby deflecting the beam in accordance with the desired scan pattern. Beam deflector assembly 54 provides for spatial scanning of the RF signal along a predetermined path toward the target area, according to any conventional scanning pattern such as a spiral or a raster scan pattern. In the embodiment shown, beam deflector assembly 54 operates under the control of computer 22, wherein the direction of deflection can be correlated with the RF energy being received. Alternatively, the beam deflector assembly need not be controlled by computer 22 if a sensor is provided for registering deflection position and generating a signal to the computer.

As an alternative means of beam scanning, one or more movable deflectors can be used to redirect the beam along a given scan path. Here, for example, the beam deflector assembly may comprise rotating reflecting members that disperse the beam according to a predetermined scanning pattern. By way of example, a pair of rotating cylindrical deflector cylinders may be utilized to deflect the beam, wherein the beam reflected from the surface of a first deflector assembly (i.e., an X direction), configured as a cylindrical polygon having a plurality of faces from which the RF beam is reflected toward a similar second deflector assembly (i.e., a Y direction) with faces that are oriented perpendicular to the first reflector assembly. The deflector assemblies would be preferably configured to rotate at a predetermined angular rate, or alternatively in steps, wherein the first deflector assembly horizontally disperses the beam while the second reflector assembly subsequently disperses the beam vertically. The first and second deflector assemblies preferably comprise motor driven rotating multi-sided prismatic mirrors, such as constructed of polished aluminum, with the X and Y mirrors being synchronized by gear reduction, or an alternate synchronization mechanism. It should also be appreciated that tilted reflective plates, MEMs based reflectors, and other mechanical deflection mechanisms may be utilized to direct the beam to a scene from which reflections of the transmitted signal are correlated.

It will be appreciated that the movement of the beam deflector must be known to the computer so that the direction of the beam at any given time may be determined, which allows the reflected signal being detected by the RF receiver to be combined, or otherwise correlated, with the beam direction for locating the amplitude information at the proper locations on an image display. Two general methods of determining the output direction of the RF signal beam are available: (1) the computer controls the operation of the deflector assembly, wherein the programming associated with the computer has access to the direction information along the scan path, (2) a sensor is coupled to the deflector assembly whose output is received by the computer allowing it to determine the output direction of the RF signal beam based on the position within the scan path at a particular point in time. A deflector assembly implementation should consider the effects of beam spreading, wherein $\lambda/d$ is the beam diffraction angle, while it should be recognized that reduced image sharpness will occur as a consequence of increasing the distance to the target.

Figure 4:
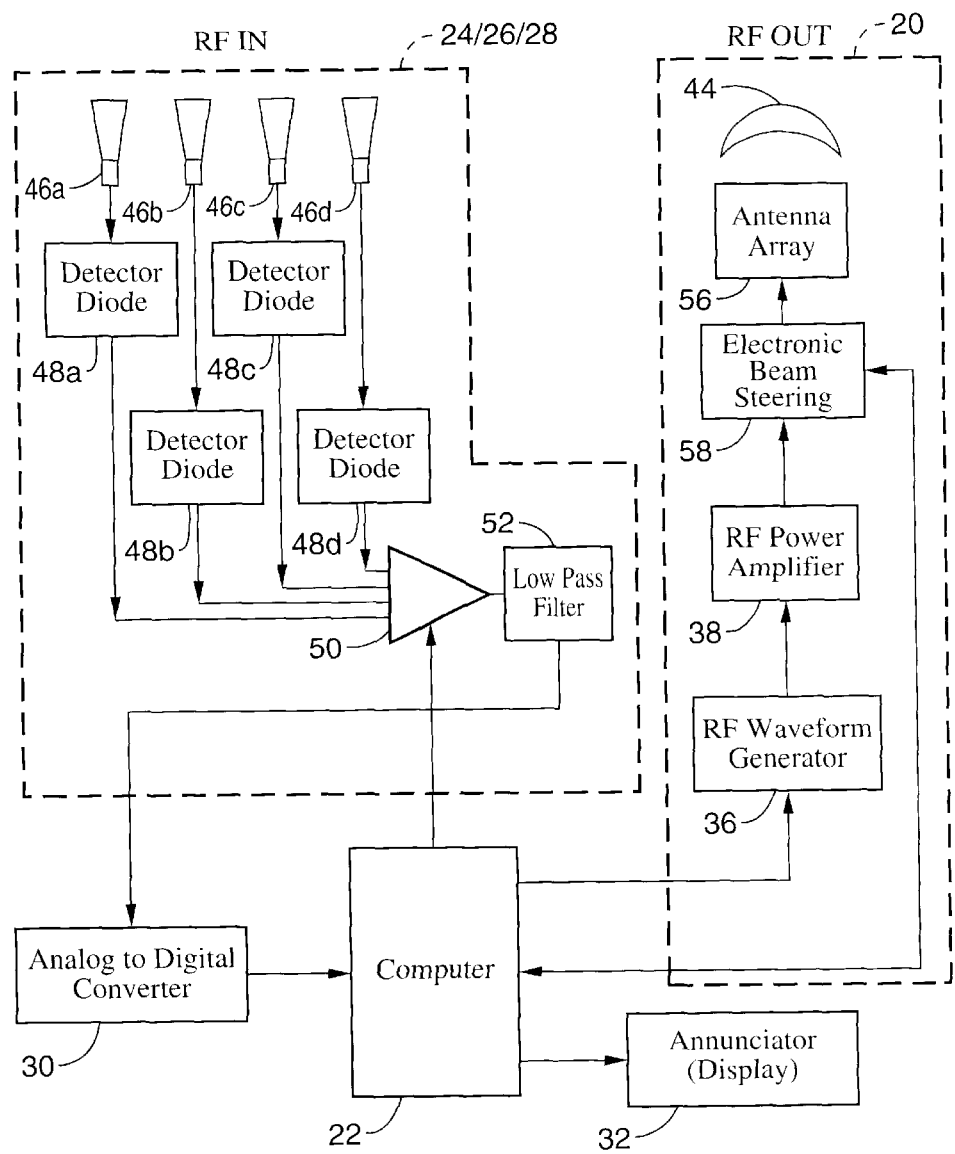
FIG. 4 is an electrical schematic for another embodiment of the imaging system according to the present invention, shown using electronic beam scanning.

While simple mechanical or electromechanical mechanisms are generally preferred for modulating the antenna direction, or modulating the orientation of a deflector from which the radio-frequency beam is reflected toward the target along a desired scan path, it will be appreciated that beam scanning may be provided by alternative methodologies for modulating the path of the RF output beam in relation to a target, such as conventional electronic scanning mechanisms or the like. FIG. 4 depicts an embodiment of the system in which electronic beam scanning is performed. In this embodiment, the radiation pattern of an antenna array 56 is modulated with an electronic beam steering assembly 58 before passing through lens 44. The beam direction is modulated to follow any desired scanning pattern, such as conventional spiral or raster scanning patterns. The electronic scanning may be provided in a number of ways, such as by utilizing phase relationships between multiple antenna outputs, or by use of variable delay elements between antenna outputs.

It should be appreciated that the preceding beam direction modulation methods were provided by way of example, and that the direction of the beam may also be modulated using electronic scanning means which may utilize phase relationships and so forth to direct the beam along a scanning path.

The method of the present invention may be implemented without the need of high-speed processors, or dedicated DSP devices, to perform signal processing on the received signals; however, enhancement of resolution and other image factors can be improved by optionally performing selected signal processing functions within the software programming of the system. In addition, the use of signal processing allows for resolving quantitative data, such as object size and relative position, and can be combined with the use of predetermined thresholds for activating alarms and other forms of annunciating devices. Additional information may be optionally combined within the signals for the reflected RF energy for concurrent display, or be displayed separately. Examples of this additional information include moving map displays, direction indications, and other metrics associated with the given application.

Detector array elements 46 are preferably spatially separated and aimed in the general direction of the target area to be scanned. The detector array may have a horizontal as well as a vertical distribution in space to provide a wide receiver aperture. The detector array should be placed in such a way as to avoid initial reflections of the microwave RF beam from the surface of the snow in the target area. The use of two high frequency RF sources scanning the scene at slightly different angles can provide for the capture of stereo images to allow three-dimensional images to be displayed. Preferably, the RF output from the two beam sources should be alternated in time when using the embodied detector scheme so that the transmission source associated with received signals may be differentiated according to temporal displacement.

Certain simple embodiments of the present system may be subject to registering external RF interference along with the reflected RF signal (signal echo) from the target area. The undesired registration of this background radiation may be compensated for in a number of ways. One simple method of compensation is to suspend output of the RF output signal, or to otherwise redirect the RF output to prevent reflections back into the detector, and to detect the magnitude of the RF signal at that time, which corresponds to the background radiation associated with the given portion of the scene. The compensation amplitude may then be subtracted from the detected reflection amplitudes to compensate for background radiation. It will be appreciated that no additional hardware is necessary for executing this process as it may be performed by programming which executes within computer 22. If situations frequently arise in which interfering background radiation is of significantly higher amplitude than the scanning beam echo, then additional circuitry should be provided to differentiate the reflected signal from background RF signals. For example, narrow-band detection circuits, or a circuit capable of recognizing a specific pattern in the transmitted scanning beam, which provides for rejection of interfering background radiation. The conventional method utilized in radar receiver electronics may be adopted in which mixer diodes and intermediate frequency (IF) modulation circuitry can be used to replace detector diodes 48 and provide increased rejection of the background radiation.

The resolution of the images being displayed can be improved within computer 22 by performing pixel interpolation on a spatially displayed series of images, having a substantially known spatial relationship, through the use of conventional synthetic aperture imaging techniques. It will be appreciated that acquisition of the subpixel shifted images which are combined into an image of higher resolution, may be provided by modulating the position of the imaging system in relation to the vehicle to which it is attached, or by altering the position of the vehicle itself. The use of image processing can thereby reduce the cost of the system by reducing the required resolution of the associated components, such as the RF detectors. Generating position shifts by moving the vehicle for use in synthetic aperturing increases image resolution in an intuitive manner, as individuals attempting to get a better view of an object will generally instinctively attempt to alter their perspective in relation to the object. The position data required for combining the multiple frames of detector patterns may be derived from actual or computed movement factors of vehicle speed and position in relation to time, or by utilizing an accurate means of acquiring the system position in relation to time which reports back position data to the computer for making image calculations. Any of a number of position sensing systems may be utilized, such as inertial measurement units (IMU) and/or Global Positioning Systems (GPS). The use of an IMU coupled with a GPS, or the use of differential GPS can provide for highly accurate position indications.

The imaging system of the present invention can be implemented in a straightforward and cost-effective manner with regards to both hardware and software. The present system is able to scan a scene in azimuth and elevation from several meters above ground, and the detection process is sufficiently rapid to allow the generation of a time-stream of pictures, similar to images generated from a video camera. It will be appreciated that the present imaging system is superior in resolution, depth of scanning, simplicity of operation, cost, and size in comparison with attempting to utilize conventional ground-penetrating radar equipment to detect objects obscured beneath snow. The spatial resolution provided by the present invention improves with increasing frequency and a resolution on the order of one centimeter may be achieved utilizing a transmitter frequency of about 4 GHz. The high-resolution of the present system facilitates the detection and identification of relatively small objects within the target area. The maximum frequency which may be utilized for detecting objects beneath the snow is generally related to the spacing that exists between snow particles, which is typically on the order from about 0.1 mm to about 1 mm.

Penetration of signals through snow and ice within the present invention provides an increase of about two orders of magnitude when compared to the use of typical ground-penetrating radar systems. It will be recognized that a given amount of attenuation occurs within the water of the snow; however, sufficient signal strength should still be available for proper detection even with the use of a low-power RF transmitter. It will be appreciated that the signal strength may be increased if additional amplitude within the reflected signals is required. The device may be optionally configured for manually or automatically adjusting transmitter output power so that proper image rendering is assured for a given situation or environment. The present invention facilitates the display of high-resolution, non-specular images through the use of frequency and aperture diversification, as well as a non-coherent detection scheme.

Scanning the transmitted beam over a range of angular displacements eliminates the necessity of physically moving a transmitter antenna over the surface of a given target area, such as over a snow bank or other irregular surface. The transmitted beam may be scanned over the surface by mechanically changing the direction of the beam or by deflecting the beam from a deflector assembly. The scanning pattern may follow any desired generally repetitive scan pattern, such as raster, spiral, helical, Palmer, nodding, and so forth. As described, the beam scanning means may redirect the beam output from the transmitter, either electronically, electromechanically, or mechanically.

Figure 5:
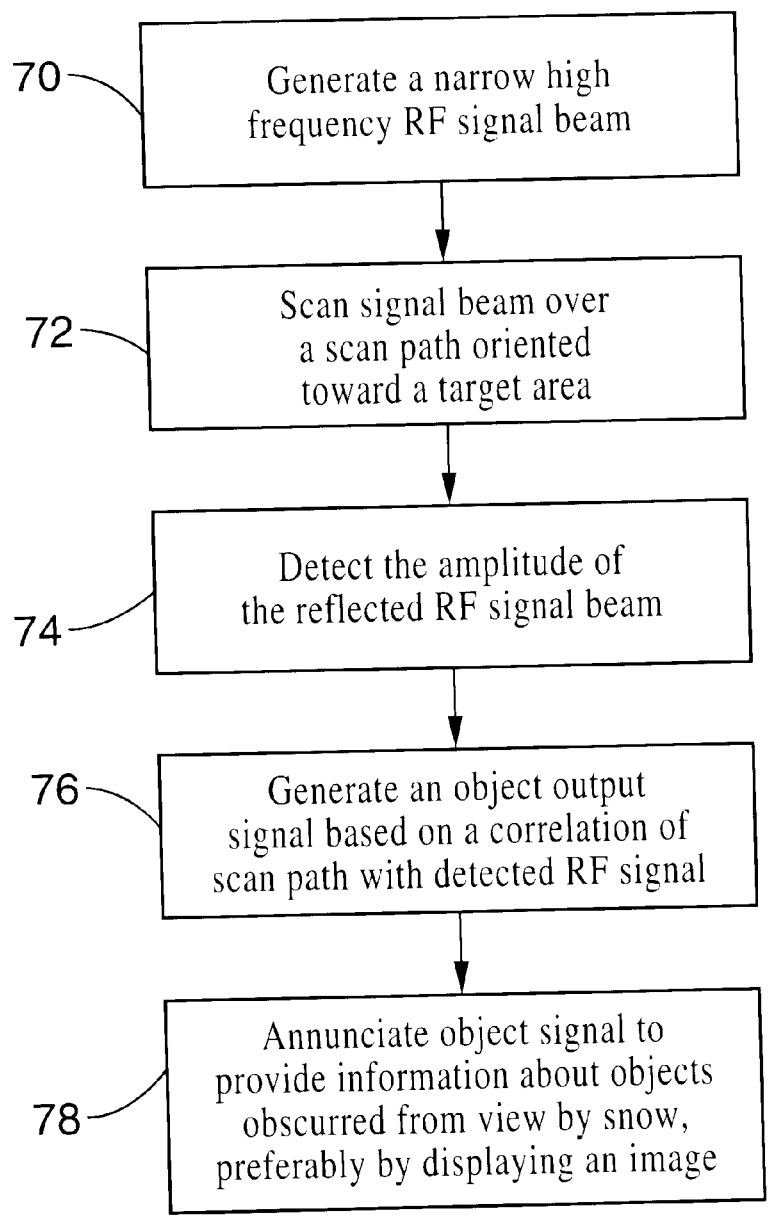
FIG. 5 is a flowchart illustrating the basic method according to an embodiment of the present invention for detecting objects which maybe obscured by snow or material of similar composition.

FIG. 5 depicts the basic imaging method of the present invention which is capable of detecting objects which may be obscured by snow or material of similar composition. A narrow high frequency RF signal beam, such as microwave in the 100 MHz to 6 GHz range, is generated at block 70. The RF signal beam is directed over a known predetermined scan path toward the target area in a process of scanning the target area, as shown in block 72. The scan path ascribes a two-dimensional path in the target area, wherein two-dimensional images may be rendered by registering the magnitude of the reflected RF over the scan path. Furthermore, an additional RF source may be utilized to direct a beam from a slightly different vantage point, wherein combining the reflecting information can allow rendering three-dimensional images. The RF beam is in the appropriate frequency range and power to penetrate snow to a depth of over two meters for impingement upon and reflection from object surfaces found therein. The amplitude of the reflected RF beam is detected within a detector, as per block 74. An object detection signal is then generated in block 76 in response to the amplitude of the RF energy which has been reflected from objects in the target area in response to the direction of the RF signal beam output, such as azimuth and elevation. It will be appreciated that the amplitude and transmit direction may be correlated in a number of ways without departing from the teachings of the present invention. The output direction of the RF signal beam may be easily determined from the scan path position at a given instant in time. The correlation process preferably comprises generating an image signal for displaying the reflected energy at the position on the display which corresponds with object position along the scan path. In a simple case, in which the scan path of the RF beam follows the same path as the display scan path, such as raster scanning, the correlation entails simply converting detected amplitude to a signal amplitude within the generated object signal. The object detection signal is annunciated in response to the position of detected objects which may be obscured beneath a layer of snow, as in block 78. Preferably, the annunciation is primarily performed on an image display unit which displays an image of any object in the target area. Although less preferred, it will be appreciated that alerts, such as audible, haptic, and/or visual, can be activated in response to the relative position and distance of objects being detected using the present method.

Figure 6:
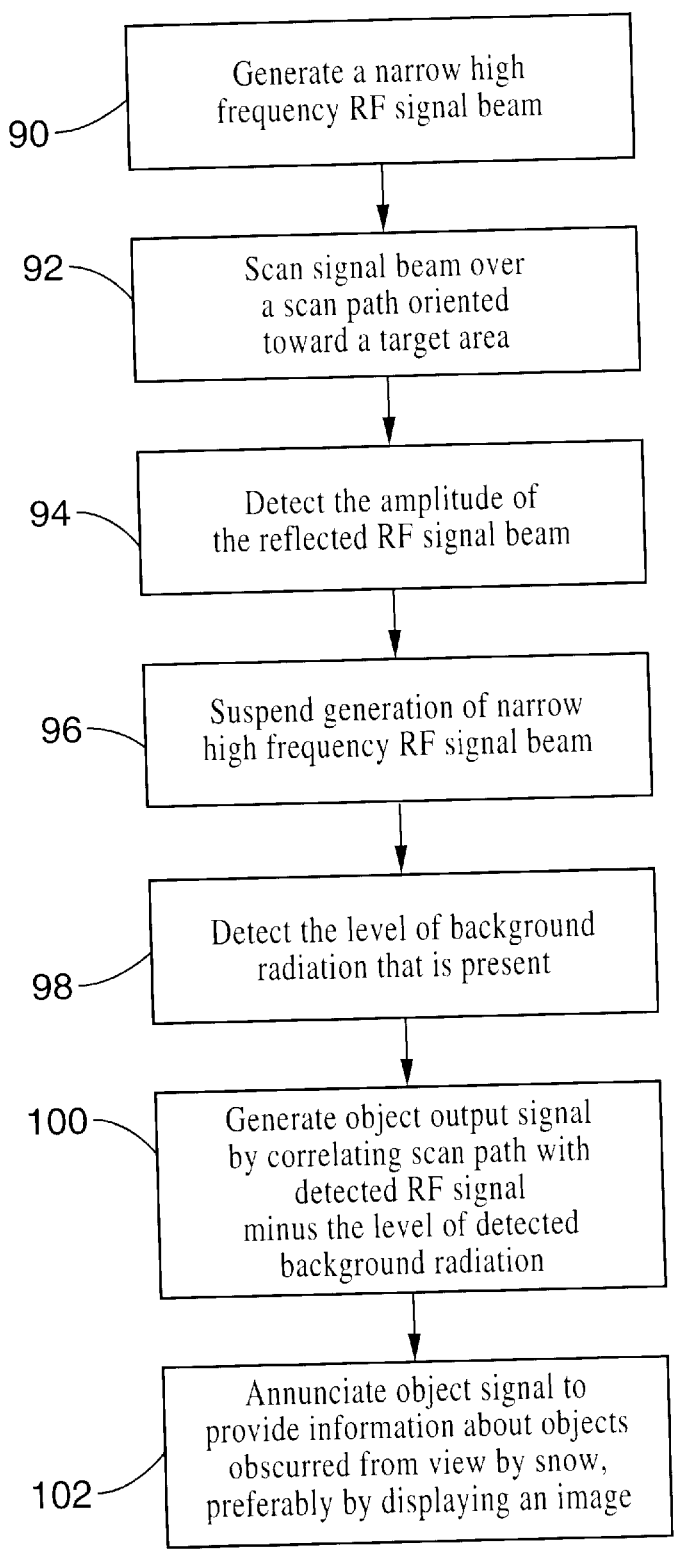
FIG. 6 is a flowchart illustrating a background radiation compensation method according to an aspect of the present invention.

FIG. 6 depicts a method of compensating for background radiation, that may otherwise detract from the proper detection of objects within the target area. Similar to FIG. 5, the RF signal beam is generated at block 90, scanned at block 92, and reflections detected at block 94. However, in the present aspect of the invention, the generation, or directing of, the RF beam into the target area is suspended for a brief period of time as per block 96, during which the background level of radiation is detected which lies within the frequency range of the RF beam, as depicted in block 98. In generating an object signal in block 100, the level of background radiation is subtracted from the reflected signal to compensate for the spurious radiation. Annunciation, such as imaging, then follows according to block 102 as before.

It will be appreciated that suspending the generation or directing of the RF beam from the target area may be implemented in a number of ways. For example, suspension may be achieved by actually turning off RF beam generation for short periods of time, or by periodically shifting the generated frequency out of the range of the detectors. The RF beam may also be maintained in an active state, yet be directed in a direction such that reflections will not be registered by the detector. This latter method is capable of detecting cross-coupling of the RF signal within system circuitry which is not the result of reflections from an object surface.

Figure 7:
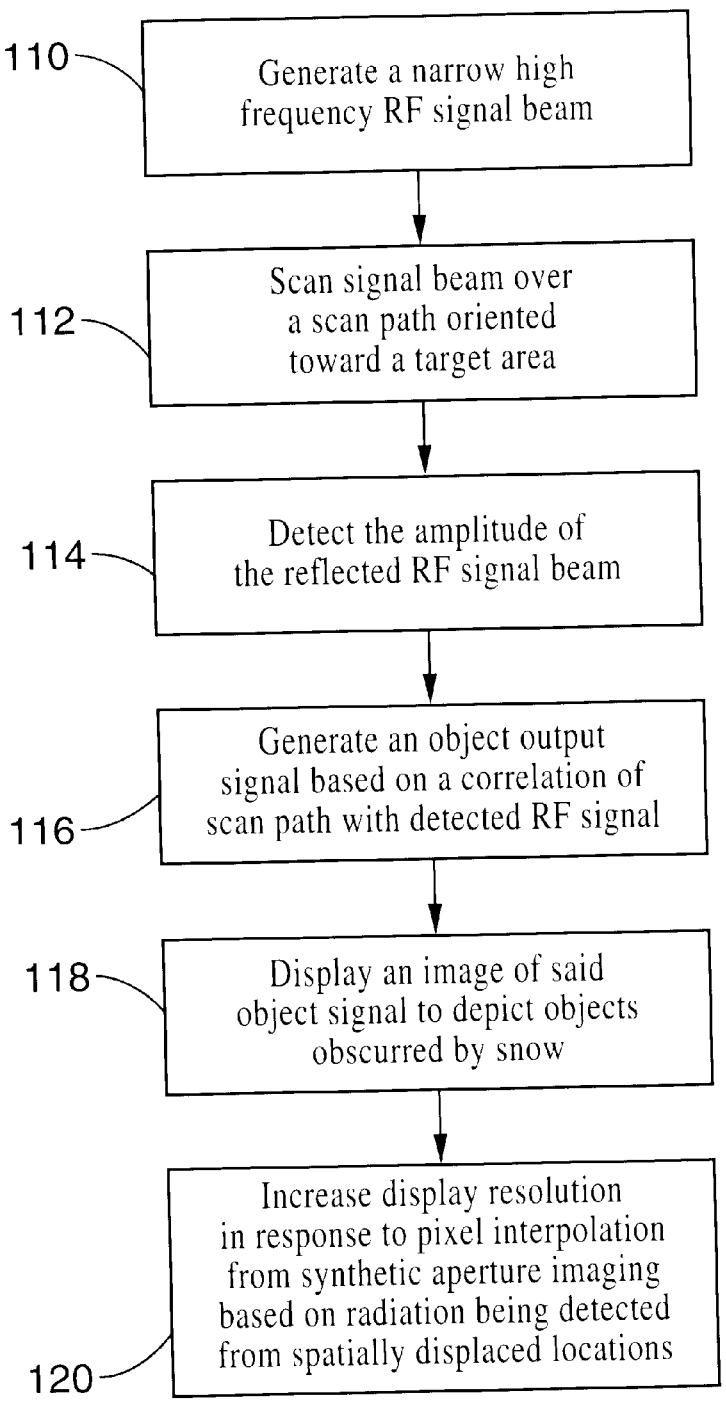
FIG. 7 is a flowchart illustrating a resolution enhancement method according to an aspect of the present invention.

FIG. 7 depicts a resolution enhancement method which can be utilized when the system is mounted on a moving platform. It will be appreciated that resolution enhancement may be less preferably practiced by modulating the position of the transmitter and receiver, in relation to the vehicle, over a known displacement. A narrow band RF signal is generated, scanned, and detected according to blocks 110, 112, and 114 from which an object signal may be generated, as per block 116, and displayed in block 118. The resolution of the displayed image may be increased as shown in block 120, in response to the availability of spatially offset detector images which are combined using pixel interpolation within a synthetic aperture imaging technique to generate images of higher resolution. The spatially offset images are gathered from slightly differing vantage points of the imaging system in relation to the object, such as in response to movement of an associated vehicle. The images which result from the synthetic aperture imaging method provide increased pixel resolution in relation to the individual contributing images. Use of the technique requires that position data be available which relates the detector responses at the different spatial locations. The position may be determined from computing a location difference based on velocity and the time between the captured data at the detector, or from a position sensing device, such as using a differential Global Positioning System (GPS), or similar means of detecting position, or changes thereof. The pixel interpolation, which results in extending image resolution, may be performed as modifications of the object signal, or resulting displayed image, and it may be performed automatically in response to the availability of sufficient spatially displaced detection patterns. It will be appreciated that the transmitter and detector position within the system may be spatially modulated to provide the additional views necessary to enhance image resolution.

Accordingly, it will be seen that this invention provide an imaging method and system for detecting objects obscured by a layer of snow, and finds application in snowy environments, such as for use in snow removal equipment and for use by searchers within a snow-laden environment. The embodiment of the present invention is exemplified using a number of beam scanning mechanisms, which direct the beam itself or a reflection of the beam toward the target area along a scanning path. An array of RF detectors is utilized for registering the RF beam reflected from objects which are otherwise obscured by snow. It will be appreciated that one of ordinary skill in the art can implement the present invention utilizing alternative forms of beam scanning and detection without departing from the teachings of the present invention. Furthermore, it will be appreciated that the exemplified circuitry may be implemented according to numerous variations, apparent to one of ordinary skill in the art, without departing from the teachings of the present invention.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for detecting an object which is obscured beneath a covering of snow, comprising:
   (a) means for generating a radio-frequency (RF) scanning beam over a predetermined scan path; and
   (b) means for detecting the magnitude of a reflection of said beam from an object in said scan path, correlating the direction of said scanning beam with the magnitude of said reflection, and generating spatial information regarding said object from said correlation.

2. An apparatus as recited in claim 1, wherein said means for generating a radio-frequency (RF) scanning beam over a scan path comprises:
   (a) an RF transmitter; and
   (b) a beam scanning device configured to spatially modulate output signals from said RF transmitter.

3. An apparatus as recited in claim 1, wherein said means for detecting the magnitude of a reflection of said scanning beam from an object in said scan path, correlating the direction of said scanning beam with the magnitude of said reflection, and generating spatial information regarding said object from said correlation, comprises:
   (a) an RF receiver;
   (b) a computer; and
   (c) programming associated with said computer for,
      (i) correlating the direction of said scanning beam with the magnitude of said reflection, and
      (ii) generating an object detection signal;
   (d) wherein said object detection signal provides spatial information about one or more objects in said scan path.

4. An apparatus for detecting an object which is obscured beneath a covering of snow, comprising:
   (a) an RF transmitter;
   (b) a beam scanning device configured to spatially modulate output signals from said RF transmitter and form a scanning beam; and
   (c) means for detecting the magnitude of a reflection of said scanning beam from an object in said scan path, correlating the direction of said scanning beam with the magnitude of said reflection, and generating spatial information regarding said object from said correlation.

5. An apparatus as recited in claim 4, wherein said means for detecting the magnitude of a reflection of said scanning beam from an object in said scan path, correlating the direction of said scanning beam with the magnitude of said reflection, and generating spatial information regarding said object from said correlation, comprises:
   (a) an RF receiver;
   (b) a computer; and
   (c) programming associated with said computer for;
      (i) correlating the direction of said scanning beam with the magnitude of said reflection, and
      (ii) generating an object detection signal;
   (d) wherein said object detection signal provides spatial information about one or more objects in said scan path.

6. An apparatus for detecting an object which is obscured beneath a covering of snow, comprising:
   (a) means for generating a radio-frequency (RF) scanning beam over a predetermined scan path;
   (b) an RF receiver;
   (c) a computer; and
   (d) programming associated with said computer for,
      (i) correlating the direction of said scanning beam with the magnitude of said reflection; and
      (ii) generating an object detection signal;
   (e) wherein said object detection signal provides spatial information about one or more objects in said scan path.

7. An apparatus as recited in claim 6, wherein said means for generating a radio-frequency (RF) scanning beam over a scan path comprises:
   (a) an RF transmitter; and
   (b) a beam scanning device configured to spatially modulate output signals from said RF transmitter.

8. An apparatus for detecting an object which is obscured beneath a covering of snow, comprising:
   (a) an RF transmitter;
   (b) a beam scanning device configured to spatially modulate output signals from said RF transmitter and form a scanning beam;
   (c) an RF receiver,
   (d) a computer; and
   (e) programming associated with said computer for,
      (i) correlating the direction of said scanning beam with the magnitude of said reflection, and
      (ii) generating an object detection signal;
   (f) wherein said object detection signal provides spatial information about one or more objects in said scan path.

9. An apparatus as recited in claim 1, 4, 6 or 8, wherein said scanning beam has an RF frequency in the range from approximately 100 MHz to approximately 6 GHz.

10. An apparatus as recited in claim 9, wherein said RF frequency is approximately 4 GHz.

11. An apparatus as recited in claim 1, 4, 6 or 8, wherein said scanning beam has an RF power level in the range from approximately 100 mW to approximately 2 W.

12. An apparatus as recited in claim 11, wherein said RF power level is approximately 1 W.

13. An apparatus as recited in claim 2, 4, 7 or 8, wherein said RF transmitter comprises:
(a) an RF waveform generator;
(b) an RF power amplifier connected to said radio frequency waveform generator.

14. An apparatus as recited in claim 13, further comprising an antenna connected to said power amplifier.

15. An apparatus as recited in claim 14, further comprising a negative refractive index lens positioned in the output path of said antenna.

16. An apparatus as recited in claim 14, wherein said antenna comprises a rutile dielectric-filled horn.

17. An apparatus as recited in claim 2, 4, 7 or 8, wherein said beam scanning device is configured to spatially modulate signals from said RF transmitter by modulating the phase relationship between multiple antennas connected to said RF transmitter.

18. An apparatus as recited in claim 2, 4, 7 or 8, wherein said beam scanning device is configured to spatially modulate signals from said RF transmitter by modulating the direction of an antenna connected to said RF transmitter.

19. An apparatus as recited in claim 2, 4, 7 or 8, wherein said beam scanning device is configured to spatially modulate signals from said RF transmitter by modulating the direction of a beam deflector device upon Which said RF signals impinge.

20. An apparatus as recited in claim 3, 5, 6 or 8, further comprising:
a display unit adapted to receive said object detection signal and to display images of said detected objects.

21. An apparatus as recited in claim 20, further comprising synthetic aperture imaging means for combining multiple images of the target area by pixel interpolation to generate composite images of the target area having higher image resolution than provided by the individual contributing images.

22. An apparatus as recited in claim 21, wherein said synthetic aperture imaging means comprises:
(a) a computer configured to receive and store multiple spatially displaced object images; and
(b) programming associated.with said computer for,
(i) interpolating between pixels of said spatially displayed object images to combine the images into a composite image having a higher image resolution than the individual contributing images.

23. An apparatus as recited in claim 3, 5, 6 or 8, wherein said RF receiver comprises:
(a) a detector array; and
(b) a summing amplifier configured to sum and amplify signals received by said detector array.

24. An apparatus as recited in claim 23, wherein said computer controls the gain of said summing amplifier.

25. An apparatus as recited in claim 23, wherein said detector array comprises:
(a) a plurality of antennas; and
(b) a plurality of RF detectors associated with said antennas.

26. An apparatus as recited in claim 25, wherein said RF detectors comprise Schottky diodes.

27. An apparatus as recited in claim 1, 4, 6 or 8, further comprising means for periodically suspending, or redirecting, said generated radio frequency beam, and for detecting the level of background radiation present for use in compensating the object detection signal for background radiation levels.

28. An apparatus as recited in claim 27, wherein said means for periodically suspending, or redirecting, said radio-frequency transmissions comprises:
programming executed on a computer and adapted to selectively deactivate, or redirect, the output of said radio-frequency transmitter so that the background radiation level is detected.

29. An apparatus as recited in claim 3, 5, 6 or 8, further comprising an annunicator responsive to said object detection signal for indicating detection of an object.

30. An apparatus as recited in claim 29, wherein said annunicator is selected from the group consisting essentially of audible, visual, haptic, and kinesthetic alert devices.

31. A method of detecting objects whose visibility is obscured by a layer of snow, comprising:
generating a narrow radio-frequency signal beam of sufficient frequency and power to penetrate snow;
scanning said signal beam over a predetermined scan path oriented toward a target area;
detecting the amplitude of the reflected radio-frequency signal beam; and
generating an object detection signal based on correlating said predetermined scan path with the amplitude of said detected radio-frequency signal.

32. A method as recited in claim 31, further comprising:
annunciating the receipt of said object detection signal in response to objects obscured from view by snow.

33. A method as recited in claim 32, wherein said annunciating of said object detection signal is performed by displaying an image of objects on a display in response to radio-frequency signal reflections from said target area.

34. A method as recited in claim 31, further comprising:
suspending the generation of the radio-frequency signal beam for predetermined periods of time;
detecting the level of background radiation that is present during said suspension of radio-frequency signal beam generation; and
compensating for the background radiation when generating staid object detection signal.

35. A method as recited in claim 31, further comprising:
enhancing image resolution by performing synthetic aperture, imaging in which image pixel intensity is interpolated based on the amplitude of the radio-frequency signal beams being detected from spatially displaced locations.

36. A method as recited in claim 31, wherein said narrow high frequency radio-frequency signal beam is generated- .within an approximate range of frequencies between 100 MHz and 6 GHz.

37. A method as recited in claim 31, wherein the step of scanning said signal beam over a predetermined scan path comprises deflecting said narrow high frequency radio-frequency signal beam toward said target area following a predetermined scanning pattern.

38. A method as recited in claim 31, wherein said generation of said object detection signal comprises combining the amplitude of said detected radio-frequency signal and position information along said predetermined scan path.

39. A method as recited in claim 31, further comprising generating an alarm to alert an operator of said system.

40. A method as recited in claim 39, wherein said alarm comprises audible video or kinesthetic operator feedback.

41. A method as recited in claim 40, wherein said kinesthetic feedback comprises coupling a haptic feedback device to the seat, or controls, of said operator.

* * * * *

UNITED STATES PATENT AND TRADEMARK OFFICE
CERTIFICATE OF CORRECTION

PATENT NO. : 6,621,448 B1
DATED : September 16, 2003
INVENTOR(S) : Ty A. Lasky, Tabib Shahrdad and Bahram Ravani It is certified that error appears in the above-identified patent and that said Letters Patent is hereby corrected as shown below:

Title page,
Item [57], ABSTRACT,
Line 6, change "the:RF" to -- the RF --
Line 8, change "arid" to -- and --
Line 10, change "Which" to -- which --

Column 2,
Line 64, change "The-system maybe" to -- The system may be --.
Line 66, change "a-moveable" to -- a movable --.

Column 3,
Line 7, change "allows-for" to -- allows for --
Line 9, change "and possible" to -- and differentiating from amongst the various objects buried in the snow, such as the possible --.

Column 4,
Line 56, change "stationary.loca-" to -- stationary location. --.
Line 57, delete "tion."

Column 7,
Line 4, change "annunicator" to -- annunciator --.

Column 9,
Line 36, change "annunicator" to -- annunciator --.

Column 10,
Line 32, change "MEMs based" to -- MEMS-based --.

Column 14,
Line 56, change "provide an" to -- provides an --.

Column 15,
Line 51, change "claim 1 ," to -- claim 1, --

Column 17,
Line 43, change "associated.with" to -- associated with --.

UNITED STATES PATENT AND TRADEMARK OFFICE
CERTIFICATE OF CORRECTION

PATENT NO. : 6,621,448 B1
DATED : September 16, 2003
INVENTOR(S) : Ty A. Lasky, Tabib Shahrdad and Bahram Ravani It is certified that error appears in the above-identified patent and that said Letters Patent is hereby corrected as shown below:

Column 18,
Lines 9 and 12, change "annunicator" to -- annunciator --.
Line 48, change "generated-" to -- generated --.
Line 49, change ".within" to -- within --.

Signed and Sealed this

Twentieth Day of July, 2004

JON W. DUDAS
*Acting Director of the United States Patent and Trademark Office*